US007206911B2

(12) United States Patent
Wolfgang et al.

(10) Patent No.: US 7,206,911 B2
(45) Date of Patent: Apr. 17, 2007

(54) METHOD, SYSTEM, AND PROGRAM FOR A SYSTEM ARCHITECTURE FOR AN ARBITRARY NUMBER OF BACKUP COMPONENTS

(75) Inventors: John Jay Wolfgang, Tucson, AZ (US); Philip Matthew Doatmas, Tucson, AZ (US); Kenneth Fairclough Day, III, Tucson, AZ (US); Kenneth Wayne Boyd, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 305 days.

(21) Appl. No.: 10/786,845

(22) Filed: Feb. 25, 2004

(65) Prior Publication Data

US 2005/0188165 A1    Aug. 25, 2005

(51) Int. Cl.
*G06F 12/16*    (2006.01)

(52) U.S. Cl. .......................... 711/162; 711/161; 714/6; 707/204

(58) Field of Classification Search ...................... None
See application file for complete search history.

(56) References Cited

U.S. PATENT DOCUMENTS

| | | | |
|---|---|---|---|
| 5,504,861 | A | 4/1996 | Crockett et al. |
| 5,615,329 | A | 3/1997 | Kern et al. |
| 5,734,818 | A | 3/1998 | Kern et al. |
| 6,003,044 | A | 12/1999 | Pongracz et al. |
| 6,341,340 | B1 | 1/2002 | Tsukerman et al. |
| 6,463,501 | B1 | 10/2002 | Kern et al. |
| 6,785,786 | B1 * | 8/2004 | Gold et al. ............... 711/162 |
| 6,826,666 | B2 * | 11/2004 | Berkowitz et al. ........ 711/162 |
| 6,959,368 | B1 * | 10/2005 | St. Pierre et al. ........ 711/162 |

(Continued)

OTHER PUBLICATIONS

Bart Jacob, "Grid Computing: What are the Key Components:?", IBM Corp., (online) [retrieved on Nov. 17, 2003] www.106.ibm.com/developerworks/grid/library/gr-overview/, pp. 1-6.

(Continued)

*Primary Examiner*—Hyung Sough
*Assistant Examiner*—Jasmine Song
(74) *Attorney, Agent, or Firm*—Janaki K. Davda; Konrad Raynes & Victor LLP

(57) ABSTRACT

Disclosed is a technique for transferring data using multiple backup components. Responsibility for a portion of data is assigned to a first backup component. When a data update for the portion of data is received at the first backup component from a primary source, the data update is mirrored to a second backup component that is not assigned responsibility for the portion of data.

Also disclosed is a technique for processing data updates with a group of backup components. It is determined that a new backup component is active. Near an end of a consistent transactions set formation period, responsibility for one or more portions of data are assigned to each backup component in the group and to the new backup component. During a next consistent transactions set formation period, data updates are processed with each backup component in the group and the new backup component.

Moreover, disclosed is a technique for processing data updates with a group of backup components. It is determined that a first backup component in the group is no longer available. Portions of data for which the first backup component had been assigned responsibility are reassigned to each of the other backup components in the group.

45 Claims, 12 Drawing Sheets

U.S. PATENT DOCUMENTS

2003/0088746 A1    5/2003   Hino et al.
2003/0149736 A1*   8/2003   Berkowitz et al. .......... 709/213

OTHER PUBLICATIONS

IBM Corp., "Events—Grid Computing: Advancing e-business into the future", (online) [retrieved on Nov. 17, 2003] www.1.ibm.com/servers/events/grid.html, p. 1.

U.S. Appl. No. 10/788,174, filed Feb. 25, 2004, entitled "Predictive Algorithm for Load Balancing Data Transfers Across Components", by inventors P.M. Doatmas, K.F. Day III, K.W. Boyd, J.J. Wolfgang.

IBM Corp., "DFSMS/MVS Version 1 Remote Copy Administrator's Guide and Reference", document No. SC35-0169-02, file No. S390-34, 1994.

* cited by examiner

METHOD, SYSTEM, AND PROGRAM FOR A SYSTEM ARCHITECTURE FOR AN ARBITRARY NUMBER OF BACKUP COMPONENTS

BACKGROUND OF THE INVENTION

1. Field of the Invention

The present invention is related to a system architecture for an arbitrary number of backup components.

2. Description of the Related Art

Disaster recovery systems typically address two types of failures, a sudden catastrophic failure at a single point in time or data loss over a period of time. In the second type of gradual disaster, data updates to volumes may be lost. To assist in recovery of data updates, a copy of data may be provided at a remote location. Such dual or shadow copies are typically made as the application system is writing new data to a primary storage device. International Business Machines Corporation (IBM), the assignee of the subject patent application, provides two systems for maintaining remote copies of data at a secondary storage device, extended remote copy (XRC) and peer-to-peer remote copy (PPRC).

These systems provide a method for recovering data updates between a last, safe backup and a system failure. Such data shadowing systems can also provide an additional remote copy for non-recovery purposes, such as local access at a remote site. The IBM® XRC and PPRC systems are described in IBM publication "Remote Copy: Administrator's Guide and Reference," IBM document no. SC35-0169-02 (IBM Copyright 1994, 1996),which publication is incorporated herein by reference in its entirety.

In such backup systems, data is maintained in volume pairs. A volume pair is comprised of a volume in a primary storage device and a corresponding volume in a secondary storage device that includes a consistent copy of the data maintained in the primary volume. Typically, the primary volume of the pair will be maintained in a primary direct access storage device (DASD) and the secondary volume of the pair is maintained in a secondary DASD shadowing the data on the primary DASD. A primary storage controller may be provided to control access to the primary DASD and a secondary storage controller may be provided to control access to the secondary DASD.

In the IBM® XRC environment, the application system writing data to the primary volumes includes a sysplex timer which provides a time-of-day (TOD) value as a time stamp to data writes. The application system time stamps data sets when writing such data sets to volumes in the primary DASD. The integrity of data updates is related to ensuring that data updates are done at the secondary volumes in the volume pair in the same order as they were done on the primary volume. In the XRC and other prior art systems, the time stamp provided by the application program determines the logical sequence of data updates. In many application programs, such as database systems, certain writes cannot occur unless a previous write occurred; otherwise the data integrity would be jeopardized. Such a data write whose integrity is dependent on the occurrence of previous data writes is known as a dependent write. For instance, if a customer opens an account, deposits $400, and then withdraws $300, the withdrawal update to the system is dependent on the occurrence of the other writes, the opening of the account and the deposit. When such dependent transactions are copied from the primary volumes to secondary volumes, the transaction order must be maintained to maintain the integrity of the dependent write operation.

Volumes in the primary and secondary DASDs are consistent when all writes have been transferred in their logical order, i.e., all dependent writes transferred first before the writes dependent thereon. In the banking example, this means that the deposit is written to the secondary volume before the withdrawal. A consistency group is a collection of related volumes that need to be kept in a consistent state. A consistent transaction set is a collection of data updates to the primary volumes such that dependent writes are secured in a consistent manner. For instance, in the banking example, in order to maintain consistency, the withdrawal transaction needs to be in the same consistent transactions set as the deposit or in a later consistent transactions set; the withdrawal cannot be in an earlier consistent transactions set. Consistency groups maintain data consistency across volumes. For instance, if a failure occurs, the deposit will be written to the secondary volume before the withdrawal. Thus, when data is recovered from the secondary volumes, the recovered data will be consistent.

A consistency time is a time the system derives from the application system's time stamp to the data set. A consistency group has a consistency time for all data writes in a consistency group having a time stamp equal or earlier than the consistency time stamp. In the IBM® XRC environment, the consistency time is the latest time to which the system guarantees that data updates to the secondary volumes are consistent. As long as the application program is writing data to the primary volume, the consistency time increases. However, if data update activity ceases, then the consistency time does not change as there are no data sets with time stamps to provide a time reference for further consistency groups. If all the records in the consistency group are written to secondary volumes, then the reported consistency time reflects the latest time stamp of all records in the consistency group. Methods for maintaining the sequential consistency of data writes and forming consistency groups to maintain sequential consistency in the transfer of data between a primary DASD and secondary DASD are described in U.S. Pat. Nos. 5,615,329 and 5,504,861, which are assigned to IBM, the assignee of the subject patent application, and which are incorporated herein by reference in their entirety.

Typically, there is a lag between the time at which a primary storage device is updated and the time at which the secondary storage device is updated. For example, a bank customer may make a payment from a savings account into a loan account. There are two parts to this transaction—withdrawal from the savings account and payment to the loan account. The two parts of the transaction should be done and archived atomically. The order of the two parts should also be maintained (i.e., withdrawal followed by payment) in order to avoid problems. In some cases, the primary storage device may fail while a transaction is being performed. For example, data about the payment from the savings account may be sent to the secondary storage, while the withdrawal data is not sent due to system failure. In this, case, the primary storage device reflects both the withdrawal and payment, while the secondary storage device reflects only the payment. Thus, it is possible that after a disaster and recovery, only one part of the transaction is applied from the secondary storage device to the primary storage device, so that the restored account records reflect the payment in the loan account, but not the withdrawal from the savings account. In this example, the bank will lose money in the amount of the withdrawal from the savings account, which remains in the customer's account. Since the bank loses money, the bank will be unhappy with the disaster recovery.

Additionally, a backup device or computer may receive inbound data writes from the primary storage controller and may send the data writes outbound to the secondary storage controller. In order to have adequate performance in such a system, it is desirable to have a number of backup devices or computers working together to transfer data from the primary storage controller to the secondary storage controller. Additionally, the data transferred should create a consistent copy because the data restored from the secondary storage device needs to be consistent to provide value to a customer. Thus, there is a need in the art for improved transfer of data using multiple backup devices or computers.

SUMMARY OF THE INVENTION

Provided are a method, system, and program for transferring data using multiple backup components. Responsibility for a portion of data is assigned to a first backup component. When a data update for the portion of data is received at the first backup component from a primary source, the data update is mirrored to a second backup component that is not assigned responsibility for the portion of data.

Also provided are a method, system, and program for processing data updates with a group of backup components. It is determined that a new backup component is active. Near an end of a consistent transactions set formation period, responsibility for one or more portions of data are assigned to each backup component in the group and to the new backup component. During a next consistent transactions set formation period, data updates are processed with each backup component in the group and the new backup component.

Moreover, provided are a method, system, and program for processing data updates with a group of backup components. It is determined that a first backup component in the group is no longer available. Portions of data for which the first backup component had been assigned responsibility are reassigned to each of the other backup components in the group.

BRIEF DESCRIPTION OF THE DRAWINGS

Referring now to the drawings in which like reference numbers represent corresponding parts throughout.

DETAILED DESCRIPTION

Figure 1A:
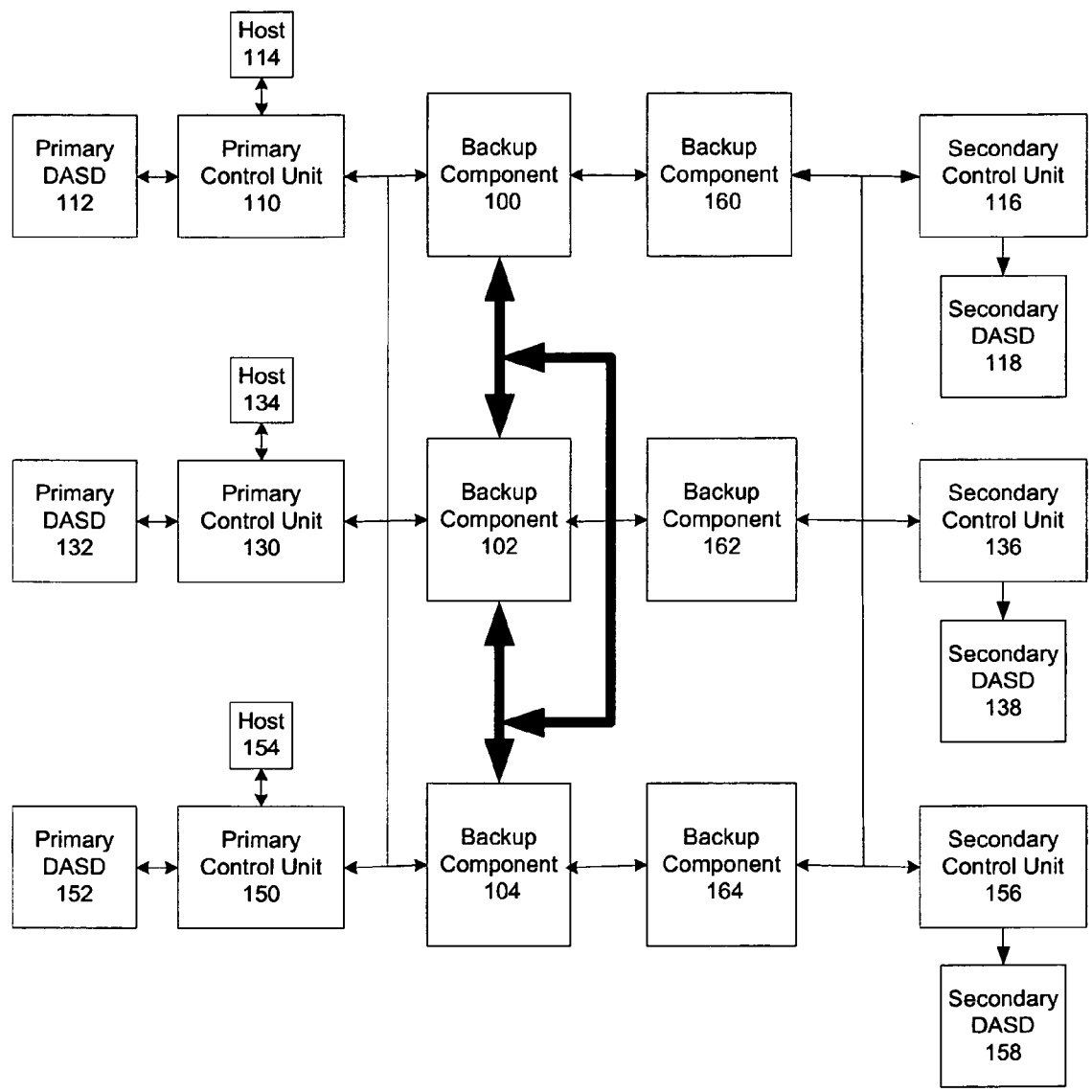
FIGS. 1A, 1B, 1C, and 1D illustrate, in block diagrams, computing environments in accordance with certain implementations of the invention.

In the following description, reference is made to the accompanying drawings which form a part hereof and which illustrate several implementations of the present invention. It is understood that other implementations may be utilized and structural and operational changes may be made without departing from the scope of the present invention.

Implementations of the invention provide a system architecture for an arbitrary ("n") number of cooperative backup components. Each backup component may receive data updates from one or more primary sources (e.g. from a storage server via PPRC or from a host via a forked write). Each backup component mirrors incoming data updates to at least one other backup component to avoid a single point-of-failure. The term "mirror" may be described as sending a copy of the data update to another backup component. Although examples herein may refer to mirroring data updates to one backup component merely for illustration, implementations of the invention allow one backup component to mirror data updates to multiple backup components.

A group of backup components cooperatively form a consistent transactions set for a portion of data (e.g., one or more volumes), where the consistent transactions set is valid across all of the backup components in the group. A "consistent transactions set" may be described as a group of transactions that, when applied at a secondary site, form a point-in-time consistent copy of the primary site for volumes that are included in the replication and assuming that the primary and secondary sites were identical at the beginning of replication.

The backup components then transfer their data updates to the secondary site.

Thus, the backup components cooperate to receive data updates from a primary source, mirror the data updates for high-availability, and transfer the updates to a secondary site. There are an arbitrary number of backup components in the system architecture, and this number may change at any time as backup components fail or are added or removed. Each backup component has the ability to communicate with all the other backup components over a communication path (e.g., over a high-speed data link). In certain implementations, this communication path is separate from the communication paths used for communication with the primary sources and secondary sites. Implementations of the invention allow the backup components to come, go, or fail, while not losing any data updates and while completing the tasks of receiving and sending data updates to the secondary site.

In certain implementations, there are pairs of identical volumes that are linked between the primary and secondary sites. Therefore, when a volume is updated at the primary site, the corresponding volume is updated at the secondary site. The data updates are propagated via the backup components.

In certain implementations, in order to preserve data integrity while maintaining adequate performance, all data updates for a particular volume are transferred to the secondary site by a single backup component. That is, each backup component is assigned responsibility for a set of volumes (including one or more volumes) before data updates arrive at the backup components. The backup component responsible for a set of volumes sends data updates for those volumes to the secondary site.

It is possible, however, for any of the backup components to receive data updates from primary sources for any volume, but a backup component that is not assigned responsibility for a volume does not send data updates for the volume to the secondary site. Instead, the backup that is not assigned responsibility for a volume but that receives data updates to that volume mirrors the data updates to the backup component that is assigned responsibility for the volume. In certain implementations, each backup component maintains information mapping backup components to the volumes for which they are responsible, identifying which backup component has mirrored data updates to this backup component, and which backup component has been sent data updates from this backup component.

FIG. 1A illustrates, in a block diagram, a computing environment in accordance with certain implementations of the invention. Primary control units 110, 130, and 150 (e.g., primary storage controllers) provide one or more host computers 114, 134, or 154, respectively, access to primary DASD 112, 132, and 152, respectively. Although examples herein may refer to DASD, implementations of the invention may be used with various storage devices and are not intended to be limited to use with DASD. The primary control units 110, 130, and 150 may also have primary caches (not shown) in which data updates to tracks in the primary DASD 112, 132, and 152, respectively, are maintained until destaged to primary DASD 112, 132, and 152. Back-up copies of all or a subset of the volumes of the primary DASD 112, 132, and 152 may be maintained at secondary DASD 118, 138, and 158, respectively.

A primary site may include primary control units 110, 130, and 150, primary DASD 112, 132, and 152, and host computers 114, 134, and 154. A secondary site may include secondary control units 116, 136, and 156 (e.g., secondary storage controllers) and secondary DASD 118, 138, and 158.

In certain implementations, a "volume pair" may be described as a volume in the primary DASD and the shadow of that volume in the secondary DASD that maintains a back-up copy of the data at the primary volume in the volume pair. In certain implementations, for each primary volume, there is a corresponding secondary volume with consistent contents; this is a volume pair. For example, data updates to the primary DASD 112 are transferred to the secondary control unit 116 for storage in the secondary DASD 118.

The primary control units 110, 130, and 150 may further include a non-volatile storage unit (not shown), such as a battery-backed up volatile memory, to maintain a non-volatile copy of updates. The primary control units 110, 130, and 150 and secondary control units 116, 136, and 156 may be comprised of the IBM® 3990, Model 6 Storage Controller, Enterprise Storage Server® (ESS), or any other control unit known in the art.

Backup components 100, 102, and 104 receive data updates from primary sources. For example, in the illustration of FIG. 1A, backup components 100, 102, and 104 transfer data updates made to primary DASD 112, 132, and 152 to secondary control units 116, 136, and 156 via backup components 160, 162, and 164. The term "backup component" may be described as, for example, a device or computer. Although three backup components 100, 102, and 104 communicating with the primary control units 110, 103, and 150, are illustrated, there may be "n" backup components. Also, although three backup components 160, 162, and 164 communicating with the secondary control units 116, 136, and 156 are illustrated, there may be "n" backup components.

Each backup component 100, 102, and 104 may include a processor, a buffer, and a computer program for transferring data updates from the primary control units 110, 130, and 150 to the backup components 160, 162, and 164, respectively. Each of the backup components 160, 162, and 164 may include a computer program for transferring data updates to secondary control units 116, 136, and 156, respectively. For example, the computer program for transferring the data updates in backup components 100, 102, and 104 may be a system data mover (SDM) program, such as the SDM program included in the IBM® XRC system. Thus, data updates are transferred between the primary 110, 130, and 150 and secondary 116, 136, and 156 control units via the backup components 100, 102, 104, 160, 162, and 164.

Each backup component 100, 102, and 104 may transfer data updates from any primary control unit 110, 130, and 150. Also, each backup component 100, 102, and 104 may communicate with each other. In certain implementations, the communication paths between the primary control units 110, 130, and 150 and the backup components 100, 102, and 104 are separate from the communication paths between the backup components 100, 102 and 104 themselves.

Each volume from each primary DASD that is being replicated corresponds to a volume on a secondary DASD. For example, a first volume on primary DASD 112 is backed up to a volume on secondary DASD 138, and a second volume on primary DASD 112 is backed up to a volume on secondary DASD 158. In certain implementations, one or more volumes are not backed up.

In certain implementations, backup components 100, 102, and 104 receive data updates from the primary control units 110, 130, and 150. In certain implementations, backup components 100, 102, and 104 may intercept data updates to primary DASD 112, 132, and 152.

Primary DASD 112, 132, and 152 and secondary DASD 118, 138, and 158 contain volumes. In certain implementations, one backup component 100, 102, or 104 is responsible for processing data updates for one or more specified volumes. For example, backup component 102 may process all data updates with update information for Volume 1 and Volume 6 on primary DASD 112, while backup component 104 may process all data updates with update information for Volume 2 on primary DASD 112. The backup component 100, 102, or 104 responsible for a volume is responsible for transferring data updates for that volume to backup components 160, 162, and 164.

In certain implementations, the backup components 100, 102, 104, 160, 162, and 164, the primary control units 110, 130, and 150, and secondary control units 116, 136, and 156 communicate via communication paths, such as direct high speed transmission lines (e.g., an Enterprise System Connection (ESCON®) link). However, the communication paths may be comprised of any other communication means known in the art, including network transmission lines, fiber optic cables, etc.

Figure 1B:
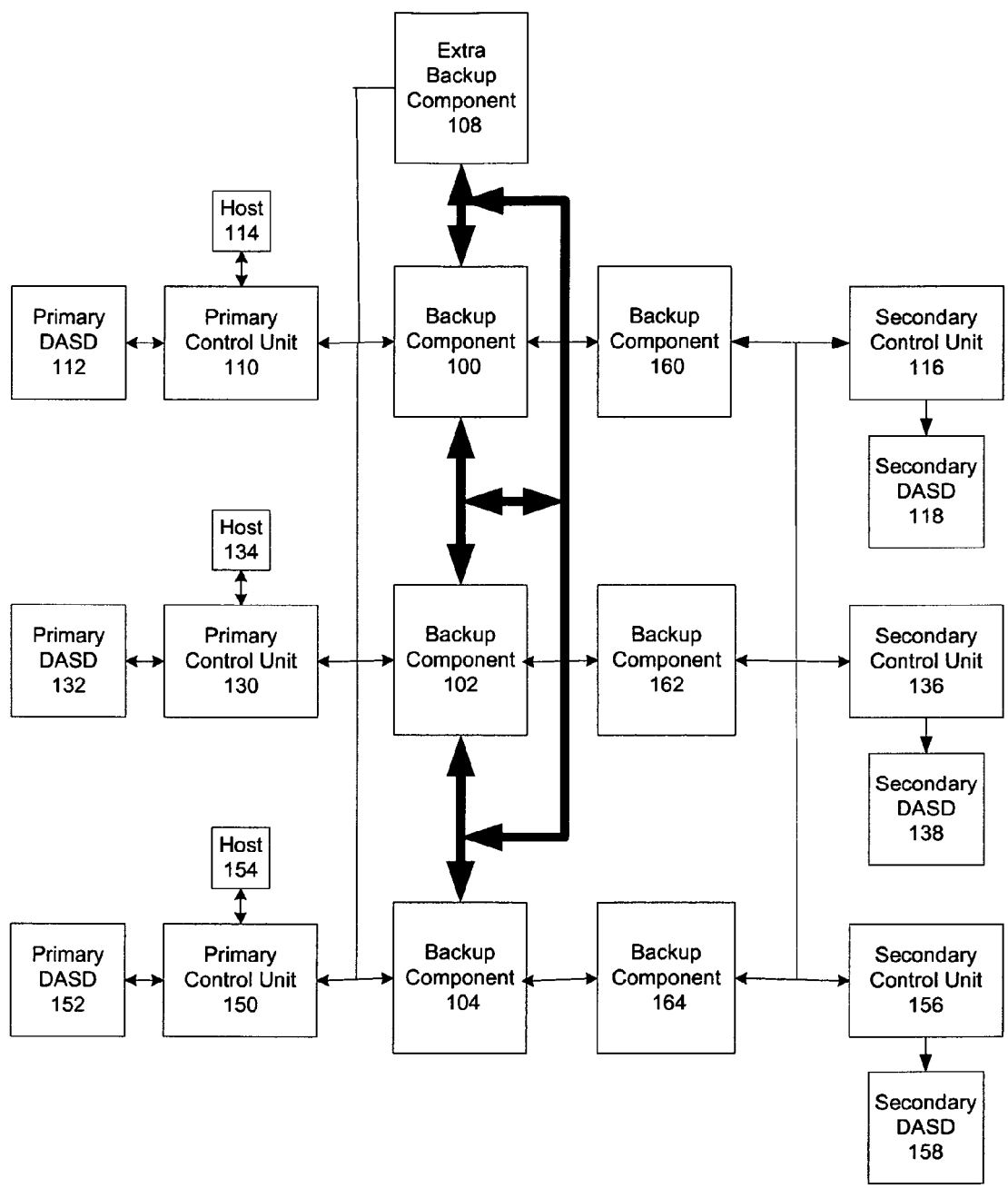

FIG. 1B illustrates, in a block diagram, a computing environment in accordance with alternative implementations of the invention. In particular, an extra backup component 108 may be able to take over processing for a backup component 100, 102, or 104 that is unable to continue processing (e.g., fails or is removed for repair).

Figure 1C:
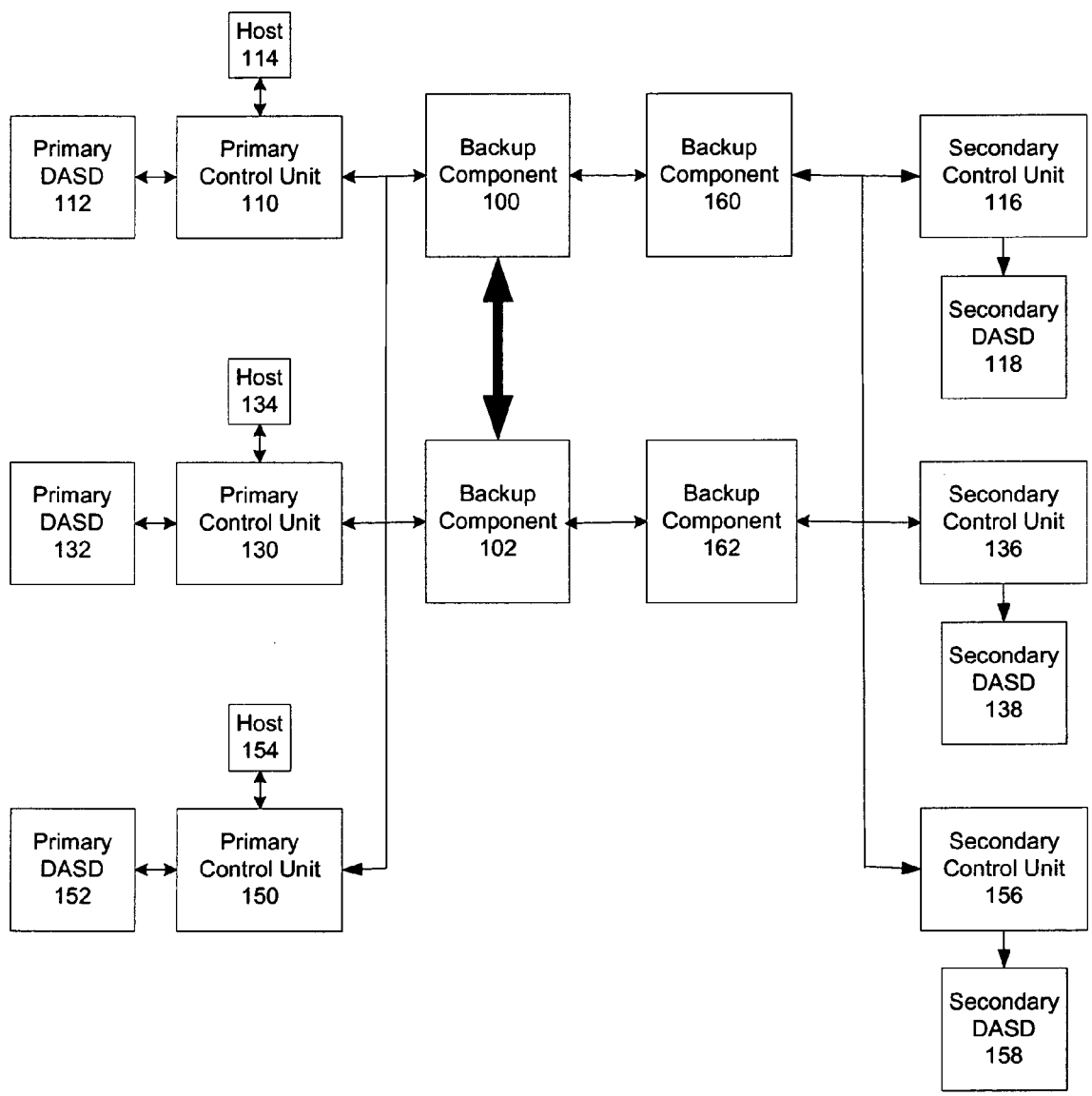

FIG. 1C illustrates, in a block diagram, a computing environment in accordance with alternative implementations of the invention. In particular, there may be fewer backup components 100 and 102 than there are primary control units 110, 130, and 150. Each primary control unit 110, 130, or 150 may be linked to one or more backup components 100 or 102.

Figure 1D:
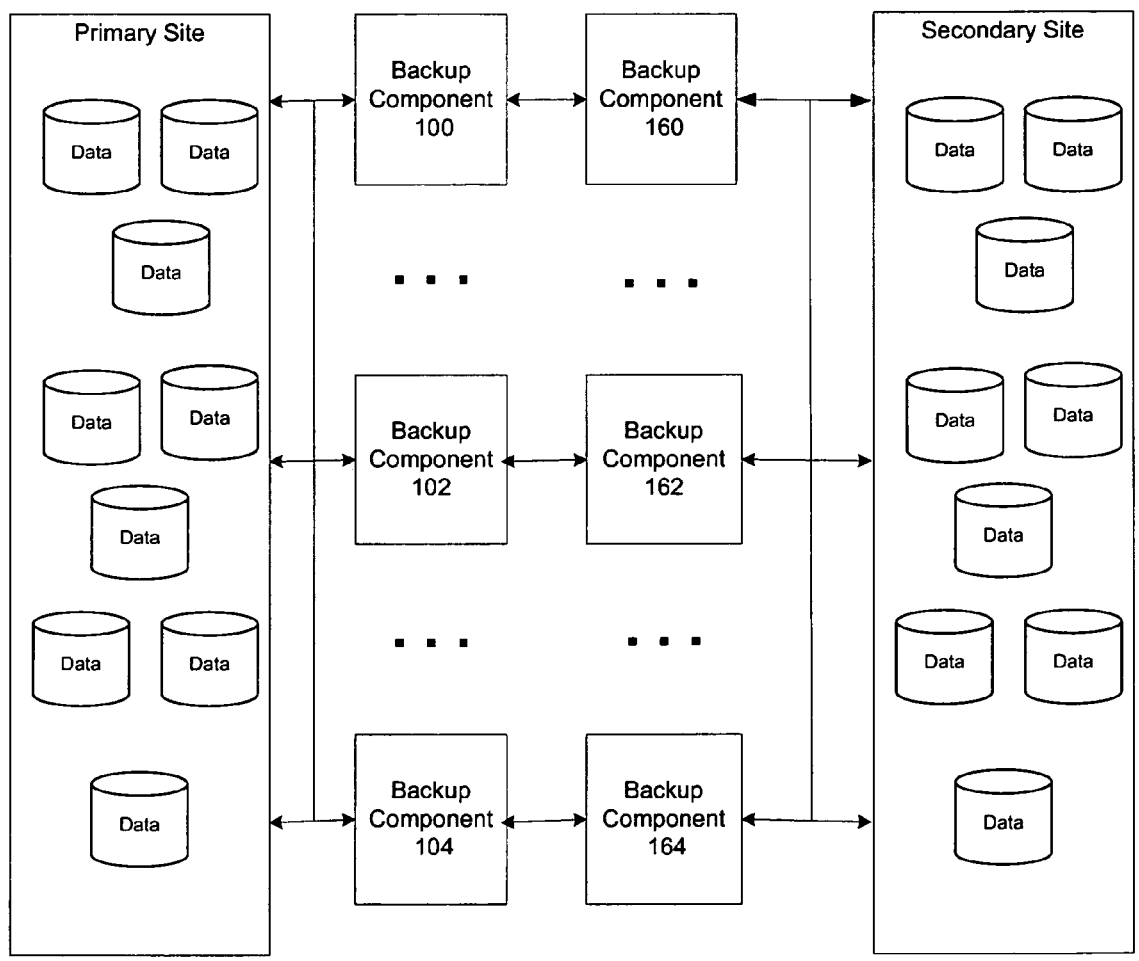

FIG. 1D illustrates, in a block diagram, a computing environment in accordance with certain implementations of the invention. There may be "n" backup components, which are represented by the ellipses. Communication between a primary site and backup components 100, 102, and 104 may be synchronous over a short distance. Communication between backup components 100, 102, and 104 and backup components 160, 162, and 164 may be asynchronous over a long distance via a Virtual Private Network (VPN) with an Internet Protocol (IP) link. Communication between backup components 160, 162, and 164 may be a direct Small Computer System Interface (SCSI) write to DASD.

With implementations of the invention, backup components 100, 102, and 104 receive inbound transactions and associate the inbound transactions with a first identifier (i.e., all transactions associated with the same identifier form a consistent transactions set). The inbound transactions that are forwarded out of backup components 100, 102 or 104 may be referred to as "outbound" transactions. In certain implementations, the backup component 100, 102, or 104 responsible for a volume forwards outbound transactions to the appropriate backup component 160, 162, or 164. In certain implementations, a backup component (e.g., 100) responsible for multiple volumes forwards the outbound transactions for the multiple volumes to one of the backup components (e.g., 160). In certain alternative implementations, a backup component (e.g., 100) responsible for multiple volumes may forward outbound transactions for the multiple volumes to different backup components 160, 162, or 164. The backup components 100, 102, and 104 may store multiple sets of transactions, with each set associated with a different identifier.

Moreover, as the backup components 160, 162, and 164 transfer transactions to secondary control units 116, 136, and 156, the backup components 100, 102, and 104 also receive additional transactions from primary control units 110, 130, and 150.

Certain implementations of the invention create consistent copies of data at a secondary site for a set of transactions. An identifier is associated with the set of transactions. For example, the identifier may be a color (e.g., green, blue, red, or yellow), an integer, an alphanumeric string, or other identifier. In certain implementations, each set of transactions is representative of transactions that were received during a specified period of time. The period of time may be customized for different users. For example, one user may wish to have consistent copies created each minute, while another user may wish to have consistent copies created every 20 seconds. The period of time may span longer periods, such as several days. In certain implementations, the identifiers are unique for different sets of transactions.

With implementations of the invention, backup components 100, 102, 104 send outbound transactions associated with a first identifier (i.e., a consistent transactions set) to backup components 160, 162, 164. When each backup component 100, 102, and 104 completes sending all outbound transactions associated with a first identifier, the backup components 160, 162, 164 then confirm to the backup components 100, 102, 104 that they received and mirrored the data in these outbound transactions. The backup components 100, 102, 104 are then free to resume sending transactions associated with another (e.g., the second) identifier. Backup components 160, 162, and 164 send data transactions associated with a first identifier to the appropriate secondary control units 116, 136, and 156. When all backup components 160, 162, and 164 complete sending all outbound data transactions associated with a first identifier, the backup components 160, 162, and 164 are then free to send data transactions associated with another identifier to the secondary control units 116, 136, and 156. The backup components 160, 162, and 164 can receive data transactions from backup components 100, 102, and 104 while transferring data transactions to the secondary control units 116, 136, and 156.

Thus, all I/O transactions associated with an identifier are written to storage at the secondary site before any I/O transactions associated with another identifier (e.g., with another color). In this manner, when a set of transactions having an associated identifier is completely archived at the secondary site, the secondary data reflects the primary data when the transactions associated with that identifier were processed. Thus, when all I/O transactions for a given identifier have been sent to the secondary data at the secondary site, that group of secondary data is in a consistent state that is desired. At this time, the secondary data is an exact copy of the primary data at the primary site at the point in time that the consistent transactions set was formed at the primary site, and the secondary site may create copies from the secondary data. These copies are "consistent" copies that reflect the primary data at the primary site after a particular set of transactions have been applied at the secondary site to the secondary data.

Figure 2A:
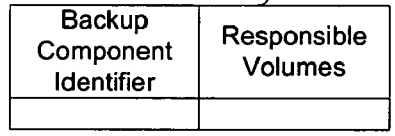
FIGS. 2A and 2B illustrate data that is maintained by each backup component in accordance with certain implementations of the invention.
Figure 2B:
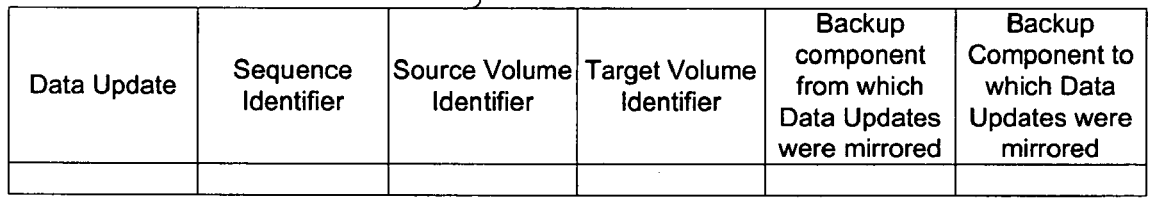

FIGS. 2A and 2B illustrate data that is maintained by each backup component 100, 102, and 104 in accordance with certain implementations of the invention. In FIG. 2A, a table 200 maps backup components to the volumes for which they are responsible. In FIG. 2B, a table 210 identifies, for each update, an associated sequence identifier, the volume from which the data update was received (i.e., a "source" volume), the volume to which the data update is to be sent (i.e., a "target" volume), a backup component to which the data update was mirrored, and a backup component from which the data update was mirrored.

Figure 3A:
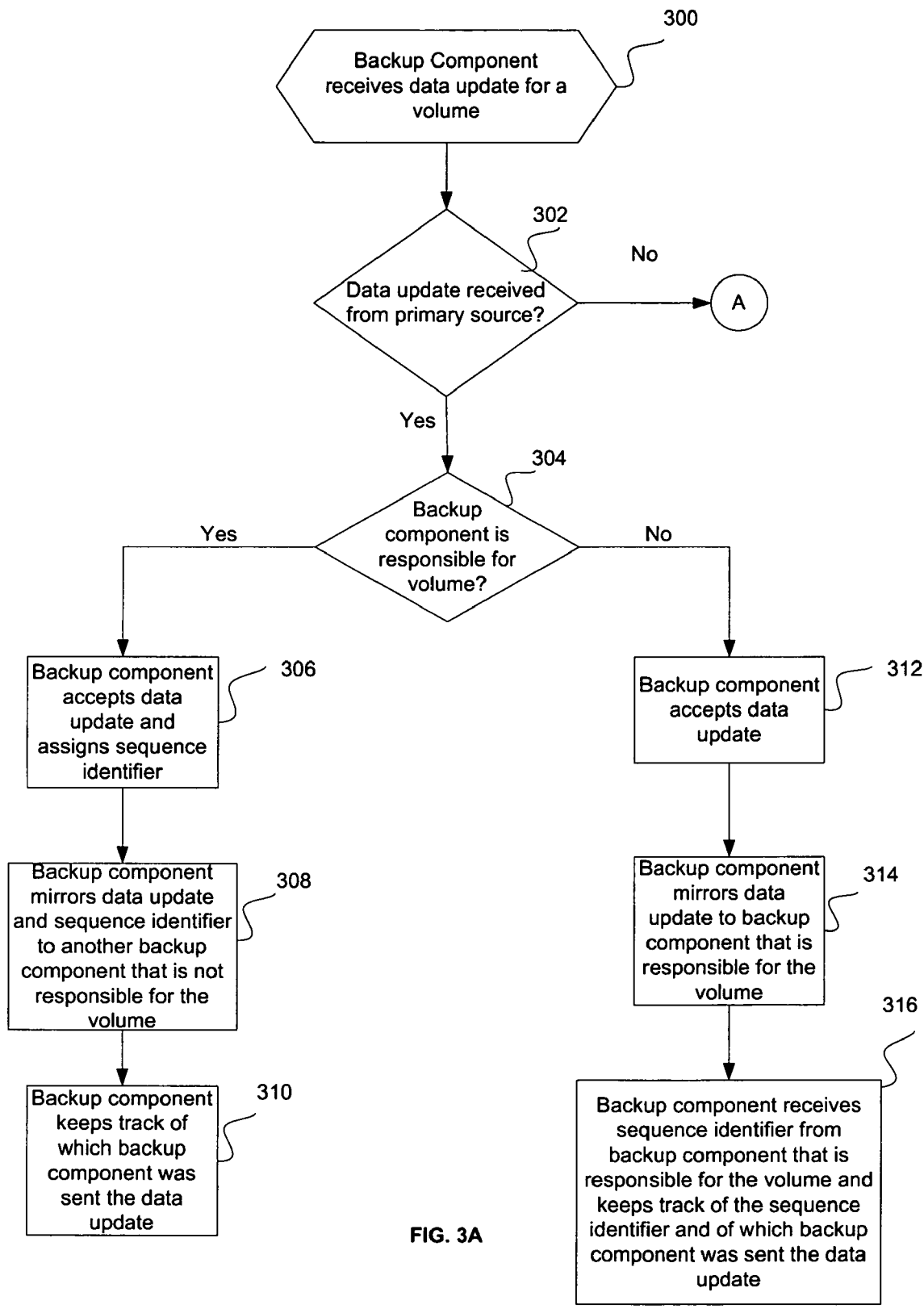
FIGS. 3A and 3B illustrate logic implemented in a backup component for processing received data updates in accordance with certain implementations of the invention.
Figure 3B:
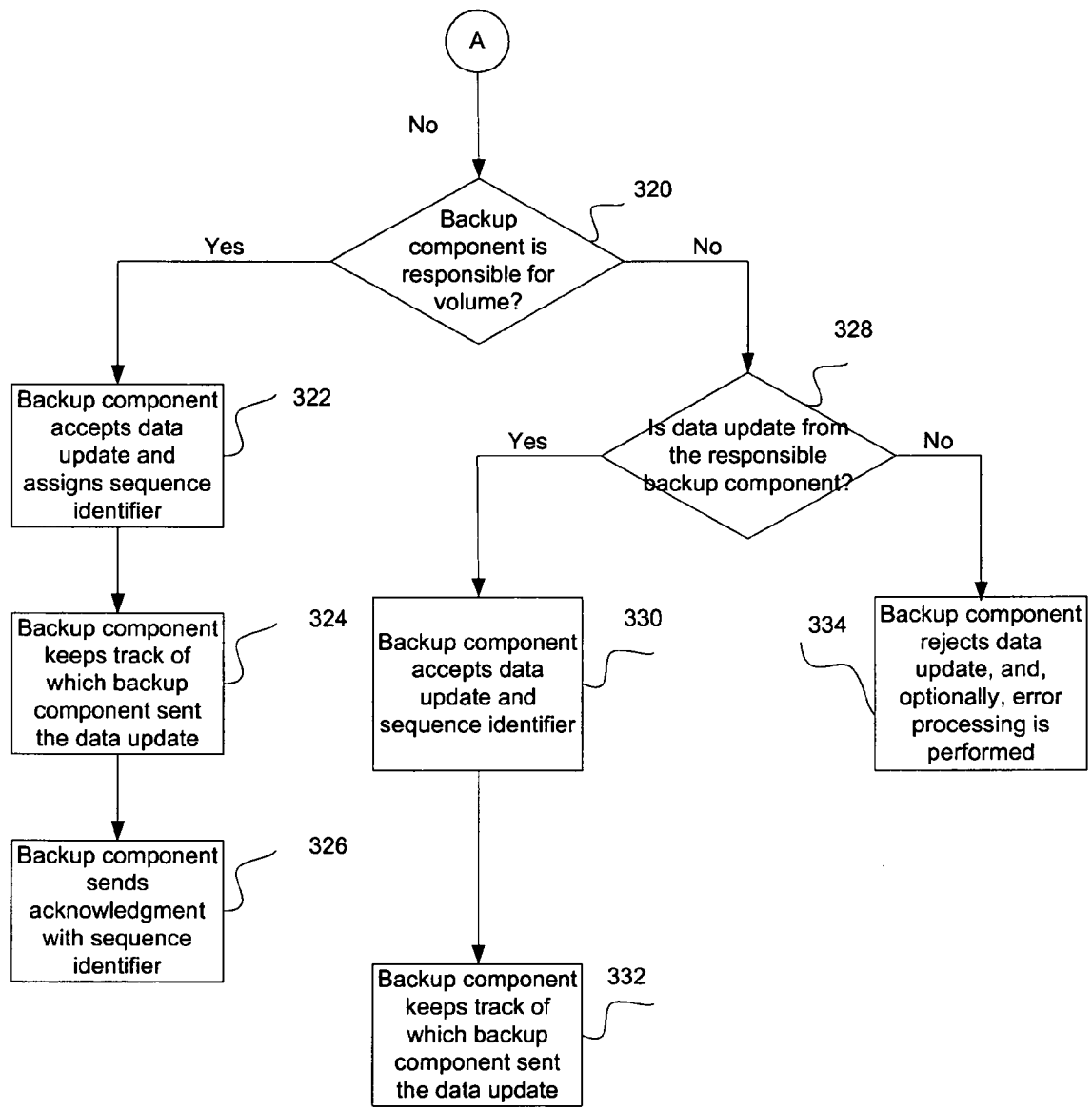

FIGS. 3A and 3B illustrate logic implemented in a backup component 100, 102 or 104 for processing data updates that are received at the backup component 100, 102 or 104 in accordance with certain implementations of the invention. Control begins at block 300 with the backup component 100, 102, or 104 receiving a data update for a volume. In block 302, the backup component 100, 102 or 104 determines whether the data update was received from a primary source (e.g., a primary control unit 110, 130 or 150). If so, processing continues to block 304, otherwise, the data update was received from another backup component 100, 102 or 104 and processing continues to block 320.

In block 304, the backup component 100, 102 or 104 that received the data update determines whether it is responsible for the volume for which the data update was received. If so, processing continues to block 306, otherwise, processing continues to block 312.

In block 306, the backup component 100, 102 or 104 accepts the data update and assigns a sequence identifier to the data update. In certain implementations, the sequence identifier is from a running list of numbers that are associated with a volume. In these implementations, each volume has a sequence of increasing numbers to facilitate putting transactions in order (e.g., after a system failure). In certain alternative implementations, one large list of sequential numbers are used across volumes. In block 308, the backup component 100, 102 or 104 mirrors the data update and the sequence identifier to another backup component 100, 102 or 104 that is not responsible for the volume for which the data update was received. In block 310, the backup component 100, 102 or 104 keeps track of which backup component 100, 102 or 104 was sent the update. That is, if a data update for a volume arrives at a backup component 100, 102 or 104 that is responsible for that volume from a primary source, the backup component 100, 102 or 104 accepts the update, assigns a sequence identifier, and mirrors the data update to one of the other backup components 100, 102 or 104.

In block 312, the backup component 100, 102 or 104 that is not responsible for the volume for which the data update was received accepts the data update. In block 314, the backup component 100, 102 or 104 mirrors the data update to the backup component 100, 102 or 104 that is responsible for the volume for which the data update was received. In block 316, the backup component 100, 102 or 104 receives a sequence identifier from backup component 100, 102 or 104 that is responsible for the volume and keeps track of both the sequence identifier and which backup component 100, 102 or 104 was sent the update. That is, if a data update for a volume arrives at a backup component 100, 102 or 104 that is not responsible for that volume from a primary source, the backup component 100, 102 or 104 accepts the update, and mirrors the data update to the backup component 100, 102 or 104 that is responsible for the volume.

In block 320 (FIG. 3B), the backup component 100, 102 or 104 has received the data update from another backup component 100, 102 or 104 and determines whether it is responsible for the volume. If so, processing continues to block 322, otherwise, processing continues to block 328.

In block 322, the backup component 100, 102 or 104 accepts the update and assigns a sequence identifier. In block 324, the backup component 100, 102 or 104 keeps track of which backup component 100, 102 or 104 sent the update. In block 326, the backup component 100, 102 or 104 sends an acknowledgment to the backup component 100, 102 or 104 that mirrored the update that includes the sequence identifier. That is, if a data update for a volume arrives at a backup component 100, 102 or 104 that is responsible for that volume from another backup component 100, 102 or 104, the backup component 100, 102 or 104 that receives the mirrored data update, accepts the data update, assigns a sequence identifier to the data update, keeps track of which backup component 100, 102 or 104 sent the update, and sends an acknowledgment that includes the sequence identifier.

In certain implementations, in block 328, the backup component 100, 102 or 104 determines whether the update is from a backup component 100, 102 or 104 that is responsible for the volume for which the update applies. If so, processing continues to block 330, otherwise, processing continues to block 332. In block 330, the backup component 100, 102 or 104 accepts the update and the sequence identifier. In block 332, the backup component 100, 102 or 104 keeps track of which backup component 100, 102 or 104 sent the update. In block 334, the backup component 100, 102 or 104 rejects the update, and, optionally, error processing is performed.

In certain alternative implementations, each backup component 100, 102 or 104 that receives a data update from the primary source timestamps the update (either instead of or in addition to a sequence number being assigned). In such implementations, the internal clocks of all backup components 100, 102, and 104 may kept synchronized via a Network Time Protocol (NTP) mechanism so that timestamps are valid for data update ordering. In yet other implementations, a common timer for all backup components 100, 102, and 104 is used to ensure time stamping is accurate, in which case a backup component 100, 102 or 104 would request the timestamp from the common timer as needed.

In certain implementations, data updates may be mirrored to any backup component 100, 102 or 104 from any 100, 102 or 104 when the data updates are being mirrored from a backup component 100, 102 or 104 that is responsible for the volume on which the data update resides. In certain implementations, each backup component 100, 102 or 104 has a default backup component 100, 102 or 104 to which the backup component 100, 102 or 104 mirrors updates.

Figure 4:
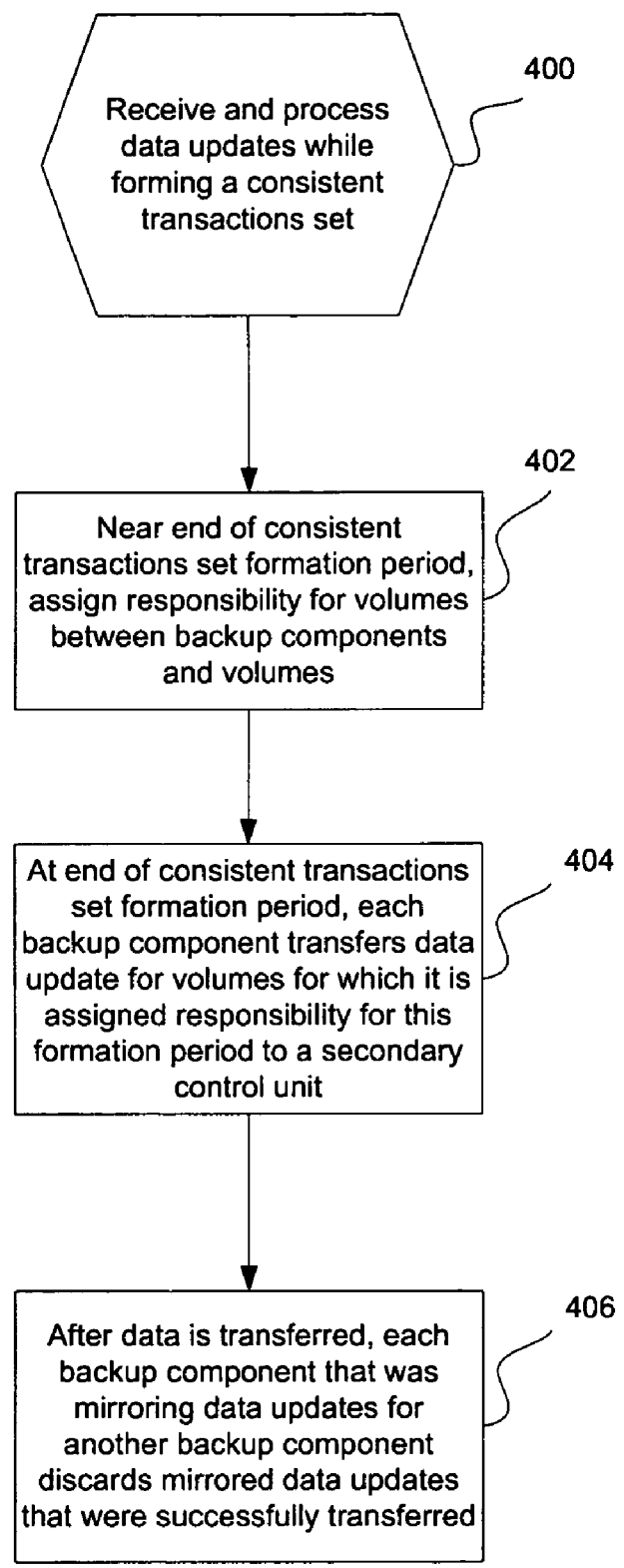
FIG. 4 illustrates logic implemented in each backup component for a consistent transactions set formation period in accordance with certain implementation.

FIG. 4 illustrates logic implemented in each backup component 100, 102, and 104 for a consistent transactions set formation period in accordance with certain implementation. Control begins in block 400 with each backup component 100, 102, 104 receiving and processing data updates to form a consistent transactions set.

In block 402, near the end of a consistent transactions set formation period, the backup components 100, 102, and 104 determine which backup components 100, 102 or 104 are responsible for which volumes for the next formation period. For example, this may be done in a round robin fashion. Alternatively, the assignments may be based on a more complicated formula or technique. A "consistent transactions set formation period" may be described as a period during which a set of backup components 100, 102, 104 receive data updates and place the data updates into a consistent transaction set. At the end of the consistent transactions set formation period, the consistent transaction set is complete.

The reassignment of volumes among the backup components 100, 102, and 104 balances the amount of data updates going to each backup component 100, 102, and 104. In certain implementations, the reassignment is done each formation period to ensure a good balance as conditions may change from one formation period to the next. In certain implementations, this is done near the end of a formation period so that the assignments are completed before data updates for a subsequent formation period arrive. In certain implementations, the first time that backup components 100, 102, and 104 are receiving data updates (i.e., prior to any formation period), the backup components 100, 102, and 104 assign responsibility for specific volumes among themselves. Reassignment of volumes is described further in co-pending and commonly owned patent application U.S. patent application Ser. No. 10/788,174, entitled "Predictive Algorithm for Load Balancing Data Transfers Across Components", by Philip M. Doatmas, and filed on Feb. 25, 2004, which is incorporated by reference herein in its entirety. Also, in certain implementations, the volumes may be reassigned to fewer than all available backup components 100, 102, and 104 (e.g., because there are fewer volumes than backup components).

In block 404, at the end of a consistent transactions set formation period (i.e., after consistent transactions sets are formed at each of the backup components 100, 102, and 104), each backup component 100, 102, and 104 transfers data updates for the volumes for which it was assigned responsibility to the secondary control units 116, 136, and 156 via backup components 160, 162, and 164. In block 406, each backup component 100, 102 or 104 that was mirroring data updates for another backup component 100, 102 or 104 determines whether the mirrored data updates have been successfully sent to the backup components 160, 162, and 164, and, if so, discards the mirrored data updates. In certain implementations, the backup components 160, 162, and 164 notify the backup components 100, 102 or 104 that are responsible for volumes at the secondary control units 116, 136, and 156 that the data updates were successfully received, and the notified backup components 100, 102 or 104 send notifications to backup components 100, 102 or 104 to which data updates were mirrored.

Figure 5:
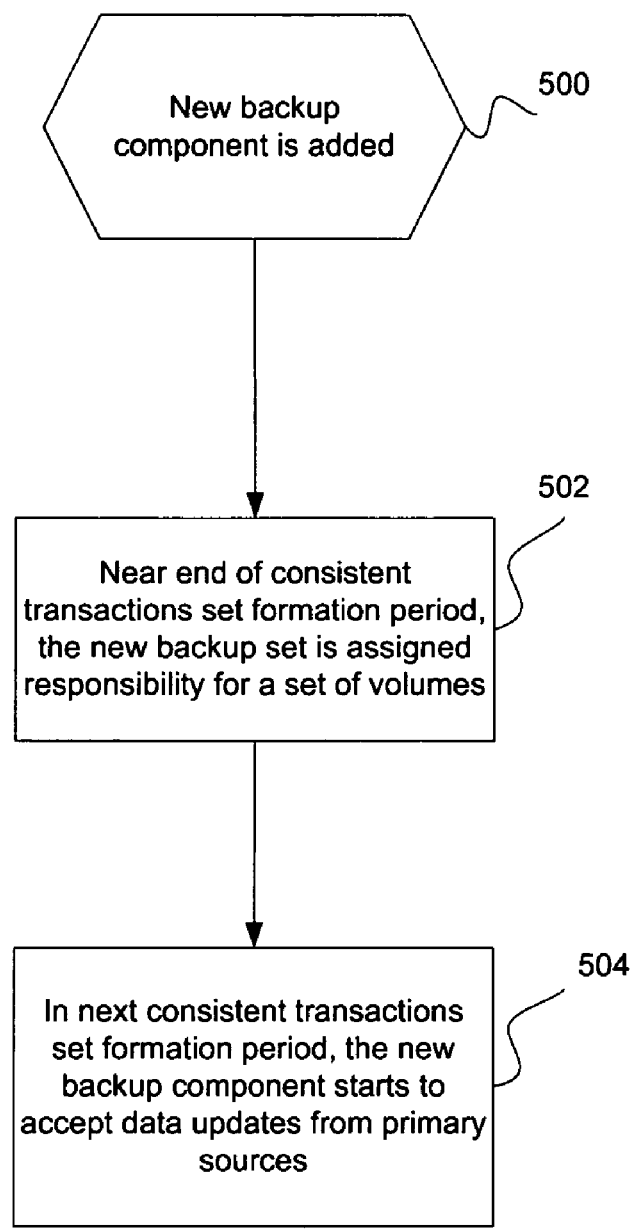
FIG. 5 illustrates logic when a new backup component comes on-line in accordance with certain implementations of the invention.

FIG. 5 illustrates logic when a new backup component comes on-line in accordance with certain implementations of the invention. Control begins at block 500 with a new backup component being added. In block 502, near the end of a consistent transactions set formation period, the new backup component is included when volume assignments are performed. That is, the new backup component may be assigned responsibility for one or more volumes. In block 504, the new backup component begins accepting and transferring data updates from primary sources at the next consistent transactions set formation period.

Figure 6A:
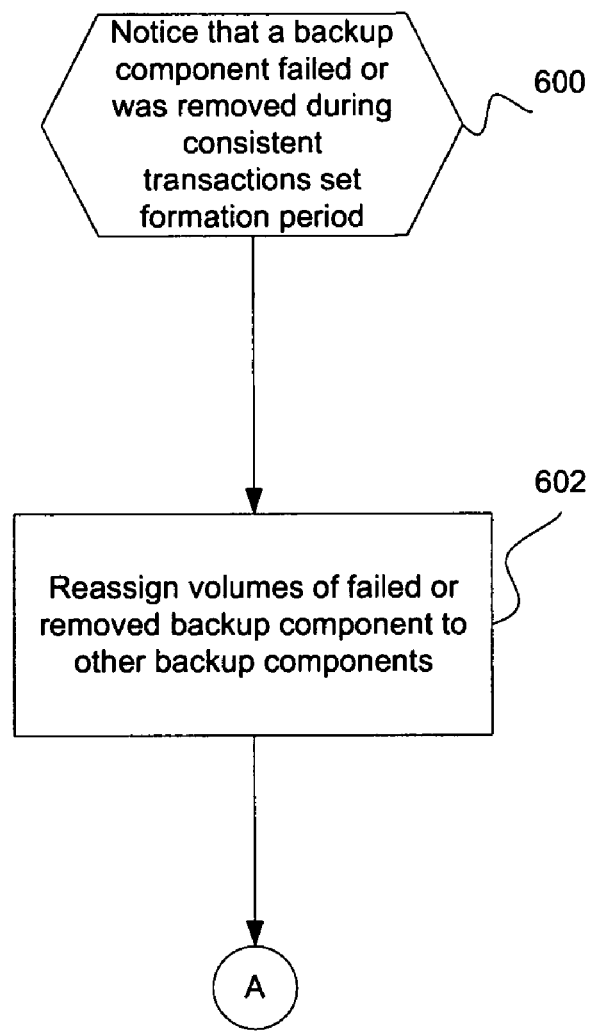
FIGS. 6A and 6B illustrate logic when a backup component fails or is removed in accordance with certain implementations of the invention.
Figure 6B:
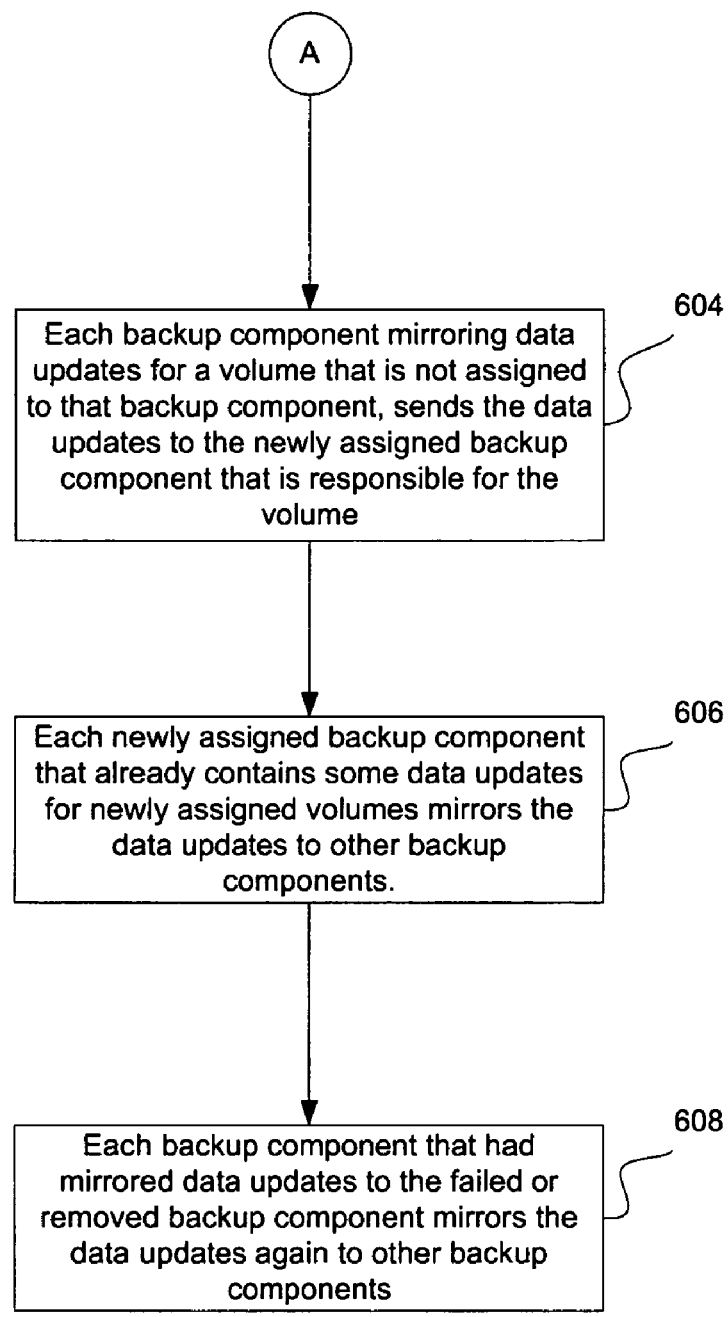

FIGS. 6A and 6B illustrate logic when a backup component 100, 102 or 104 fails or is removed (i.e., is no longer available) in accordance with certain implementations of the invention. Control begins at block 600 with a backup component 100, 102 or 104 failing or being removed during a consistent transactions set formation period. In such a case, the other backup components 100, 102 and/or 104 reconstruct the data updates of the failed or removed backup component 100, 102 or 104 and continue the consistent transactions set formation without losing any data updates. In block 602, upon noticing that a backup component 100, 102 or 104 has failed or was removed, the volumes that were assigned to that failed or removed backup component 100, 102 or 104 are reassigned to the remaining backup components 100, 102 and/or 104. In certain alternative implementations, there may be an extra backup component (e.g., 108 in FIG. 1B) available for use (i.e., an N+1 system architecture, where N represents the number of active backup components), and all volumes of the failed or removed backup component 100, 102 or 104 are assigned to the extra backup component 108.

Since the data updates for the current consistent transactions set that was on the failed backup component 100, 102 or 104 were also mirrored to other backup components 100, 102 or 104, it is possible to reconstruct the data updates on the newly assigned one or more backup components 100, 102 or 104. In block 604 (FIG. 6B), each backup component 100, 102 or 104 mirroring data updates for a volume for which the backup component 100, 102 or 104 is not responsible, sends the data updates to the newly assigned backup component 100, 102 or 104 that is responsible for the volume. The newly assigned backup component uses the sequence identifiers of the data updates to properly order the data updates.

Also, a newly assigned backup component 100, 102 or 104 may already contain at least some of the data updates for a volume to which the backup component 100, 102 or 104 was assigned because the backup component 100, 102 or 104 was a mirror site for the failed or removed backup component 100, 102 or 104. In block 606, each of these newly assigned backup components 100, 102 or 104 that already contain some data updates for the failed or removed backup component 100, 102 or 104 mirror the data updates to other backup components 100, 102 or 104. Then, the data updates are again in two locations.

The failed or removed backup component 100, 102 or 104 also acted as a mirror site for data updates for volumes assigned to other backup components 100, 102 or 104 in the system architecture. Therefore, the backup components 100, 102 or 104 recognize that data updates that had been mirrored to the failed or removed backup component 100, 102 or 104 no longer have a second copy, and, each backup component 100, 102 or 104 mirrors data updates again to other backup components 100, 102 or 104 (block 608). After transfer of ownership of the volumes, processing continues as normal.

In certain alternative implementations, each backup component 100, 102, 104 may mirror data and/or metadata describing which data was mirrored Thus, in certain implementations, only the metadata is mirrored. In these alternative implementations, when metadata is mirrored, in the case of a failure, the metadata would be redistributed in the same manner as described for redistributing mirrored data. After redistributing the metadata, the new responsible backup components 100, 102 or 104 that have metadata would request the actual data from the appropriate primary control units 110, 130 or 150 that contain the data corresponding to the metadata. Additionally, if the backup component 100, 102 or 104 that receives data updates from a primary source is not assigned responsibility for the volume on which the data resides, that backup component 100, 102, 104 would transfer the data (and, optionally, the metadata), so that the backup component 100, 102, 104 that is assigned responsibility for the volume on which the data resides would have the data.

Thus, the system architecture provided by implementations of the invention allows for scalability. Implementations of the invention provide a system architecture with an arbitrary number of backup components that form consistent transactions sets. Furthermore, backup components may join or leave a group of backup components at any time.

These characteristics are useful from a grid-computing focus, where it is desirable to add or remove backup components on demand. Also, such a system architecture allows for the system to tolerate failures of individual backup components without losing any data.

A particular volume is assigned to a particular backup component, but data updates for that volume may be sent from a primary source to any backup component, so data updates are mirrored to backup components that are assigned the volumes to which the data updates are to be applied. In case of failure or removal of a backup component, the volumes assigned to that failed or removed backup component are reassigned to the remaining backup components, which use the sequence identifiers to order the data updates. Also, volume assignments may be dynamically changed between consistent transaction set formations. Moreover, the smallest backup component unit is an individual backup component.

IBM, Enterprise Storage Server, and ESCON are registered trademarks or common law marks of International Business Machines Corporation in the United States and/or other countries.

Additional Implementation Details

The described techniques for a system architecture for an arbitrary number of backup components may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.)

or a computer readable storage medium, such as magnetic storage medium (e.g., hard disk drives, floppy disks,, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which various implementations are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The logic of FIGS. 3A, 3B, 4, 5, 6A, and 6B describes specific operations occurring in a particular order. In alternative implementations, certain of the logic operations may be performed in a different order, modified or removed. Moreover, operations may be added to the above described logic and still conform to the described implementations. Further, operations described herein may occur sequentially or certain operations may be processed in parallel, or operations described as performed by a single process may be performed by distributed processes.

The illustrated logic of FIGS. 3A, 3B, 4, 5, 6A, and 6B may be implemented in software, hardware, programmable and non-programmable gate array logic or in some combination of hardware, software, or gate array logic.

Figure 7:
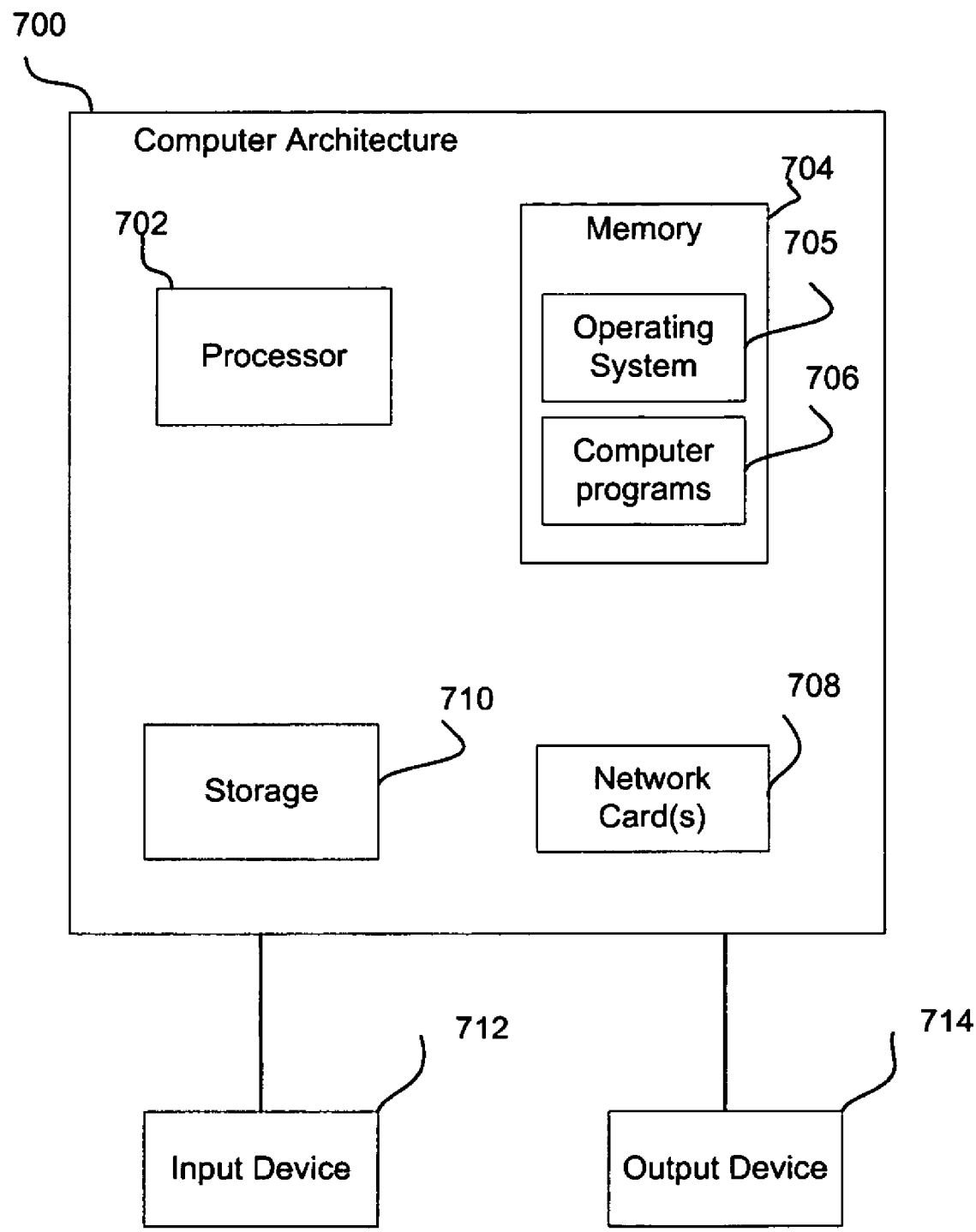
FIG. 7 illustrates an architecture of a computer system that may be used in accordance with certain implementations of the invention.

FIG. 7 illustrates an architecture of a computer system that may be used in accordance with certain implementations of the invention. For example, primary control units, secondary control units, and/or backup components may implement computer architecture 700. The computer architecture 700 may implement a processor 702 (e.g., a microprocessor), a memory 704 (e.g., a volatile memory device), and storage 710 (e.g., a non-volatile storage area, such as magnetic disk drives, optical disk drives, a tape drive, etc.). The memory 704 may include one or more buffers (not shown). An operating system 705 may execute in memory 704. The storage 710 may comprise an internal storage device or an attached or network accessible storage. Computer programs 706 in storage 710 may be loaded into the memory 704 and executed by the processor 702 in a manner known in the art. The architecture further includes one or more network cards 708 (e.g., fibre channel, Internet Protocol to communicate with other components and/or computers, etc.) to enable communication with other components and/or computers via, for example, a network. An input device 712 is used to provide user input to the processor 702, and may include a keyboard, mouse, pen-stylus, microphone, touch sensitive display screen, or any other activation or input mechanism known in the art. An output device 714 is capable of rendering information from the processor 702, or other component, such as a display monitor, printer, storage, etc. The computer architecture 700 of the computer systems may include fewer components than illustrated, additional components not illustrated herein, or some combination of the components illustrated and additional components.

The computer architecture 700 may comprise any computing device known in the art, such as a mainframe, server, personal computer, workstation, laptop, handheld computer, telephony device, network appliance, virtualization device, storage controller, etc. Any processor 702 and operating system 705 known in the art may be used.

The foregoing description of implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A method for transferring data using multiple backup components, comprising:
assigning responsibility for a portion of data to a first backup component; and
when a data update for the portion of data is received at the first backup component from a primary source, mirroring the data update to a second backup component that is not assigned responsibility for the portion of data, wherein each backup component is responsible for transferring data updates for a certain portion of data from one or more primary sources to one or more secondary sources and wherein each backup component has the ability to communicate with each other backup component over a communication path.

2. The method of claim 1, further comprising:
when the data update for the portion of data is received at the second backup component that is not assigned responsibility for the portion of data from the primary source, forwarding the data update to the first backup component.

3. The method of claim 1, further comprising:
when the data update for the portion of data is received at the second backup component that is not responsible for the portion of data, storing the data update.

4. The method of claim 1, wherein the first backup component and the second backup component communicate over a first communication path and wherein the first backup component and second backup component communicate with the primary source over a second communication path.

5. The method of claim 1, wherein the first backup component, the second backup component, and the primary source communicate over one communication path.

6. The method of claim 1, further comprising:
wherein each of the multiple backup components maintains a mapping of which backup component is assigned to particular portions of data.

7. The method of claim 1, wherein when one of the multiple backup components mirrors the data update to another backup component, further comprising:
sending a sequence identifier with the mirrored data update; and
keeping track of which backup component was sent the data update.

8. The method of claim 1, wherein when one of the multiple backup components receives a mirrored data update from another backup component, further comprising:
 receiving a sequence identifier with the mirrored data update; and
 keeping track of which backup component sent the data update.

9. A method for transferring data using multiple backup components, comprising:
 assigning responsibility for a portion of data to a first backup component;
 when a data update for the portion of data is received at the first backup component from a primary source, mirroring the data update to a second backup component that is not assigned responsibility for the portion of data, and
 when the data update for the portion of data is received at the first backup component from the second backup component that is not responsible for the portion of data,
  assigning a sequence number to the data update; and
  acknowledging receipt of the data update by sending the sequence number to the second backup component.

10. A method for processing data updates with a group of backup components, comprising:
 determining that a new backup component is active;
 near an end of a consistent transactions set formation period, assigning responsibility for transferring data updates from one or more primary sources to one or more secondary sources for one or more portions of data to each backup component in the group and to the new backup component; and
 during a next consistent transactions set formation period, processing data updates with each backup component in the group and the new backup component by transferring and mirroring the data updates.

11. The method of claim 10, wherein the new backup component becomes part of the group of backup components.

12. A method for processing data updates with a group of backup components, comprising:
 determining that a first backup component in the group is no longer available; and
 reassigning portions of data for which the first backup component had been assigned responsibility for transferring data updates from one or more primary sources to one or more secondary sources to each of the other backup components in the group.

13. The method of claim 12, wherein each of the backup components in the group that was mirroring data updates for the first backup component mirrors the data updates to the backup components that were assigned responsibility for the portions of data to which the data updates were made.

14. The method of claim 12, wherein each of the backup components that is reassigned a portion of data and that has data updates for the portion of data mirrors the data updates to another backup component.

15. The method of claim 12, wherein each of the backup components in the group that had mirrored data to the first backup component mirror data updates to another backup component.

16. An article of manufacture comprising one of hardware logic and a computer readable storage medium including code for transferring data using multiple backup components, wherein the logic or code causes operations to be performed, the operations comprising:
 assigning responsibility for a portion of data to a first backup component; and
 when a data update for the portion of data is received at the first backup component from a primary source, mirroring the data update to a second backup component that is not assigned responsibility for the portion of data, wherein each backup component is responsible for transferring data updates for a certain portion of data from one or more primary sources to one or more secondary sources and wherein each backup component has the ability to communicate with each other backup component over a communication path.

17. The article of manufacture of claim 16, wherein the operations further comprise:
 when the data update for the portion of data is received at the second backup component that is not assigned responsibility for the portion of data from the primary source, forwarding the data update to the first backup component.

18. An article of manufacture comprising one of hardware logic and a computer readable storage medium including code for transferring data using multiple backup components, wherein the logic or code causes operations to be performed, the operations comprising:
 assigning responsibility for a portion of data to a first backup component; and
 when a data update for the portion of data is received at the first backup component from a primary source, mirroring the data update to a second backup component that is not assigned responsibility for the portion of data; and
 when the data update for the portion of data is received at the first backup component from the second backup component that is not responsible for the portion of data,
  assigning a sequence number to the data update; and
  acknowledging receipt of the data update by sending the sequence number to the second backup component.

19. The article of manufacture of claim 16, wherein the operations further comprise:
 when the data update for the portion of data is received at the second backup component that is not responsible for the portion of data, storing the data update.

20. The article of manufacture of claim 16, wherein the first backup component and the second backup component communicate over a first communication path and wherein the first backup component and second backup component communicate with the primary source over a second communication path.

21. The article of manufacture of claim 16, wherein the first backup component, the second backup component, and the primary source communicate over one communication path.

22. The article of manufacture of claim 16, wherein the operations further comprise:
 wherein each of the multiple backup components maintains a mapping of which backup component is assigned to particular portions of data.

23. The article of manufacture of claim 16, wherein when one of the multiple backup components mirrors the data update to another backup component, and wherein the operations further comprise:
 sending a sequence identifier with the mirrored data update; and
 keeping track of which backup component was sent the data update.

24. The article of manufacture of claim 16, wherein when one of the multiple backup components receives a mirrored data update from another backup component, and wherein the operations further comprise:

receiving a sequence identifier with the mirrored data update; and keeping track of which backup component sent the data update.

25. An article of manufacture comprising one of hardware logic and a computer readable storage medium including code for processing data updates with a group of backup components, wherein the logic or code causes operations to be performed, the operations comprising:

determining that a new backup component is active;

near an end of a consistent transactions set formation period, assigning responsibility for transferring data updates from one or more primary sources to one or more secondary sources for one or more portions of data to each backup component in the group and to the new backup component; and during a next consistent transactions set formation period, processing data updates with each backup component in the group and the new backup component by transferring and mirroring the data updates.

26. The article of manufacture of claim 25, wherein the new backup component becomes part of the group of backup components.

27. An article of manufacture comprising one of hardware logic and a computer readable storage medium including code for processing data updates with a group of backup components, wherein the logic or code causes operations to be performed, the operations comprising:

determining that a first backup component in the group is no longer available; and reassigning portions of data for which the first backup component had been assigned responsibility for transferring data updates from one or more primary sources to one or more secondary sources to each of the other backup components in the group.

28. The article of manufacture of claim 27, wherein each of the backup components in the group that was mirroring data updates for the first backup component mirrors the data updates to the backup components that were assigned responsibility for the portions of data to which the data updates were made.

29. The article of manufacture of claim 27, wherein each of the backup components that is reassigned a portion of data and that has data updates for the portion of data mirrors the data updates to another backup component.

30. The article of manufacture of claim 27, wherein each of the backup components in the group that had mirrored data to the first backup component mirror data updates to another backup component.

31. A system for transferring data using multiple backup components, comprising:

means for assigning responsibility for a portion of data to a first backup component; and means for, when a data update for the portion of data is received at the first backup component from a primary source, mirroring the data update to a second backup component that is not assigned responsibility for the portion of data, wherein each backup component is responsible for transferring data updates for a certain portion of data from one or more primary sources to one or more secondary sources and wherein each backup component has the ability to communicate with each other backup component over a communication path.

32. The system of claim 31, further comprising:

means for, when the data update for the portion of data is received at the second backup component that is not assigned responsibility for the portion of data from the primary source, forwarding the data update to the first backup component.

33. The system of claim 31, further comprising:

when the data update for the portion of data is received at the second backup component that is not responsible for the portion of data, means for storing the data update.

34. The system of claim 31, wherein the first backup component and the second backup component communicate over a first communication path and wherein the first backup component and second backup component communicate with the primary source over a second communication path.

35. The system of claim 31, wherein the first backup component, the second backup component, and the primary source communicate over one communication path.

36. The system of claim 31, further comprising:

wherein each of the multiple backup components maintains a mapping of which backup component is assigned to particular portions of data.

37. A system for transferring data using multiple backup components, comprising:

means for assigning responsibility for a portion of data to a first backup component; and means for, when a data update for the portion of data is received at the first backup component from a primary source, mirroring the data update to a second backup component that is not assigned responsibility for the portion of data; and when the data update for the portion of data is received at the first backup component from the second backup component that is not responsible for the portion of data, means for assigning a sequence number to the data update; and means for acknowledging receipt of the data update by sending the sequence number to the second backup component.

38. The system of claim 31, wherein when one of the multiple backup components mirrors the data update to another backup component, further comprising:

means for sending a sequence identifier with the mirrored data update; and means for keeping track of which backup component was sent the data update.

39. The system of claim 31, wherein when one of the multiple backup components receives a mirrored data update from another backup component, further comprising:

means for receiving a sequence identifier with the mirrored data update; and means for keeping track of which backup component sent the data update.

40. A system for processing data updates with a group of backup components, comprising:

means for determining that a new backup component is active;

means for, near an end of a consistent transactions set formation period, assigning responsibility for transferring data updates from one or more primary sources to one or more secondary sources for one or more portions of data to each backup component in the group and to the new backup component; and means for during a next consistent transactions set formation period, processing data updates with each backup component in the group and the new backup component by transferring and mirroring the data updates.

41. The system of claim 40, wherein the new backup component becomes part of the group of backup components.

42. A system of processing data updates with a group of backup components, comprising:

means for determining that a first backup component in the group is no longer available; and means for reassigning portions of data for which the first backup component had been assigned responsibility for transferring data updates from one or more primary sources to one or more secondary sources to each of the other backup components in the group.

43. The system of claim 42, wherein each of the backup components in the group that was mirroring data updates for the first backup component mirrors the data updates to the backup components that were assigned responsibility for the portions of data to which the data updates were made.

44. The system of claim 42, wherein each of the backup components that is reassigned a portion of data and that has data updates for the portion of data mirrors the data updates to another backup component.

45. The system of claim 42, wherein each of the backup components in the group that had mirrored data to the first backup component mirror data updates to another backup component.

* * * * *